US010403154B1

(12) United States Patent
Beckman et al.

(10) Patent No.: US 10,403,154 B1
(45) Date of Patent: Sep. 3, 2019

(54) REDUCING STATUS NOTIFICATIONS USING A HIERARCHAL REFERENCE SYSTEM

(71) Applicant: Amazon Technologies, Inc., Seattle, WA (US)

(72) Inventors: Brian C. Beckman, Newcastle, WA (US); John Clark Coonley Duksta, Seattle, WA (US); Gur Kimchi, Bellevue, WA (US); Corrinne Yu, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 273 days.

(21) Appl. No.: 15/277,880

(22) Filed: Sep. 27, 2016

(51) Int. Cl.
*G08G 5/00* (2006.01)
*B64C 39/02* (2006.01)
*G06F 16/29* (2019.01)

(52) U.S. Cl.
CPC ......... *G08G 5/0043* (2013.01); *B64C 39/024* (2013.01); *G06F 16/29* (2019.01); *G08G 5/0013* (2013.01); *G08G 5/0039* (2013.01); *G08G 5/0069* (2013.01)

(58) Field of Classification Search
CPC .. G08G 5/0043; G08G 5/0013; G08G 5/0039; G08G 5/0069; G06F 16/29; B64C 39/024
See application file for complete search history.

(56) References Cited

U.S. PATENT DOCUMENTS

| 9,852,642 B2 | 12/2017 | Butler et al. | |
| 2007/0124395 A1* | 5/2007 | Edge | H04H 20/59 709/206 |
| 2015/0271290 A1* | 9/2015 | Tao | H04L 41/5051 709/217 |
| 2017/0263132 A1 | 9/2017 | Butler et al. | |

* cited by examiner

*Primary Examiner* — Khai M Nguyen
(74) *Attorney, Agent, or Firm* — Athorus, PLLC

(57) ABSTRACT

Disclosed are systems and methods for reducing the amount of messaging between aerial vehicles and between controllers of aerial vehicles and simplifying aerial vehicle traffic management. In one implementation, a large service area, such as the United States, may be separated into a series of hierarchal regions. Rather than sending notifications to all agents (e.g., aerial vehicles, controllers) in the service area, each agent may subscribe to one or more regions of the hierarchal regions and only receive messages intended for the subscribed regions. In one example, as discussed below, messages for a particular region are only sent to agents subscribed to that region. Other agents within the larger service area do not receive the messages as they may not be relevant to those agents.

16 Claims, 13 Drawing Sheets

REDUCING STATUS NOTIFICATIONS USING A HIERARCHAL REFERENCE SYSTEM

BACKGROUND

Vehicle traffic around residential areas continues to increase. Historically, vehicle traffic around homes and neighborhoods was primarily limited to automobile traffic. However, the recent development of aerial vehicles, such as unmanned aerial vehicles, has resulted in a rise of other forms of vehicle traffic. For example, hobbyists may fly unmanned aerial vehicles in and around neighborhoods, often within a few feet of a home. Likewise, there is discussion of electronic-commerce retailers, and other entities, delivering items directly to a user's home using unmanned aerial vehicles. As the number of aerial vehicles continues to increase, the risk of collisions and the amount of communications between vehicles and controllers will likewise continue to increase.

DETAILED DESCRIPTION

The present disclosure is directed to reducing the amount of messaging between aerial vehicles and between controllers of aerial vehicles and simplifying aerial vehicle traffic management. In one implementation, a large service area, such as the United States, may be separated into a series of hierarchal regions. Rather than sending notifications to all agents (e.g., aerial vehicles, controllers) in the service area, each agent may subscribe to one or more regions of the hierarchal regions and only receive notifications intended for the subscribed regions. In one example, as discussed below, notifications for a particular region are only sent to agents subscribed to that region. Other agents within the larger service area do not receive the notifications as they may not be relevant to those agents.

In addition to separating a service area into hierarchal regions, communication may be further reduced by storing path data for all vehicles of a service area in a path data store and representing each path with a unique hash value, generated based on the path data. As discussed below, path data for each aerial vehicle is a table that includes numerous time based segments that specify aspects of the path for the aerial vehicle (e.g., altitude, heading, velocity, angular velocity, position, pose, etc.). Rather than controllers and/or aerial vehicles exchanging the full path data for each path, a hash function may be used to generate unique hash values for each path. In such implementations, the path data for each path may be maintained in a path data store that is accessible to each agent and the agents may send, receive and/or store the hash values representative of the different paths. An agent, upon receiving a hash value, can obtain the corresponding path data from the data store. Such implementations allow for multiple agents to easily access and utilize the same information and independently compute the same paths and/or hash values from the data without direct communication between those agents. For example, two controllers may independently access the path data store and compute the same hash value for a path using the common hash function.

Figure 1:
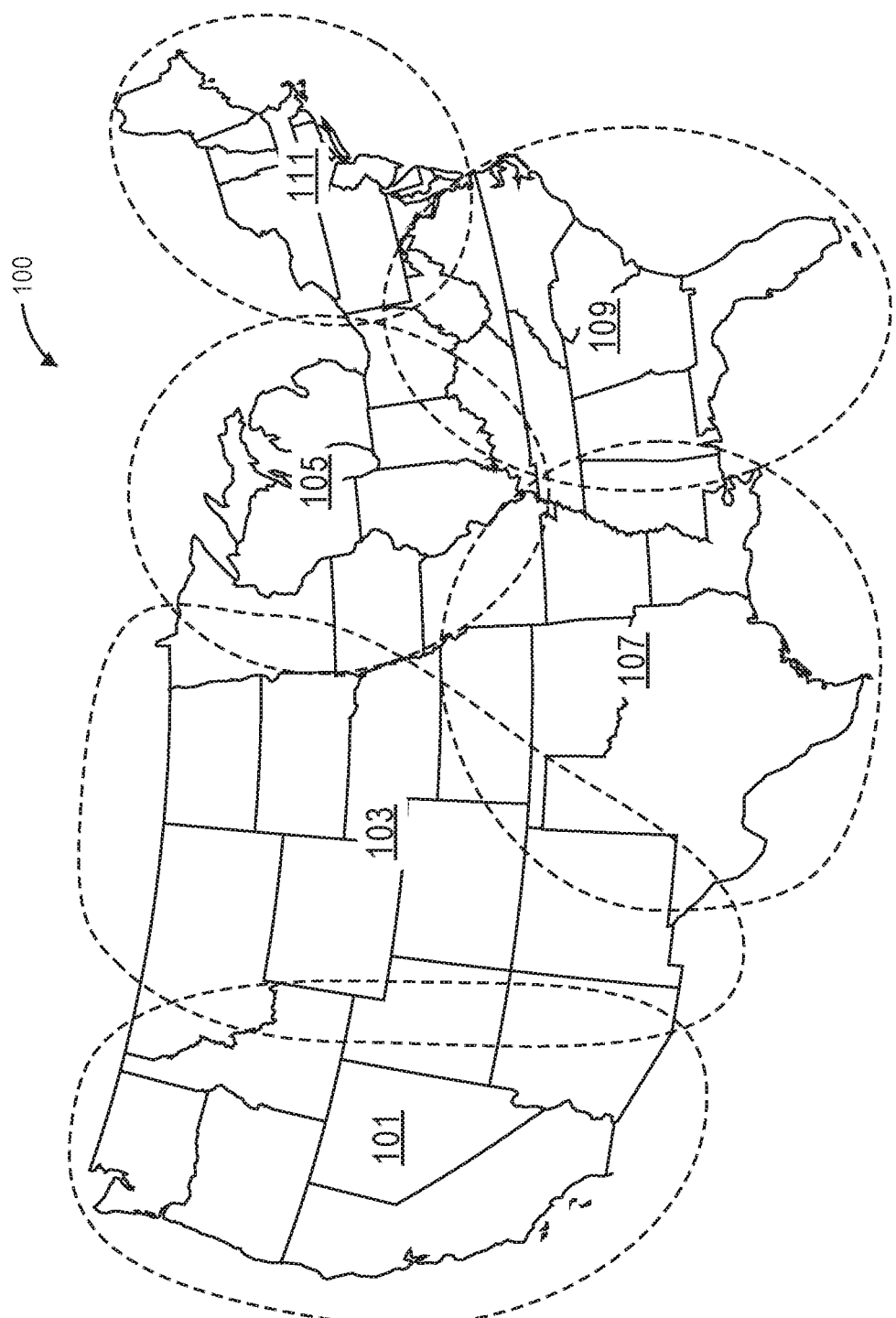
FIG. 1 is a view of the United States of America separated into regions for vehicle notification management, according to an implementation.
Figure 2:
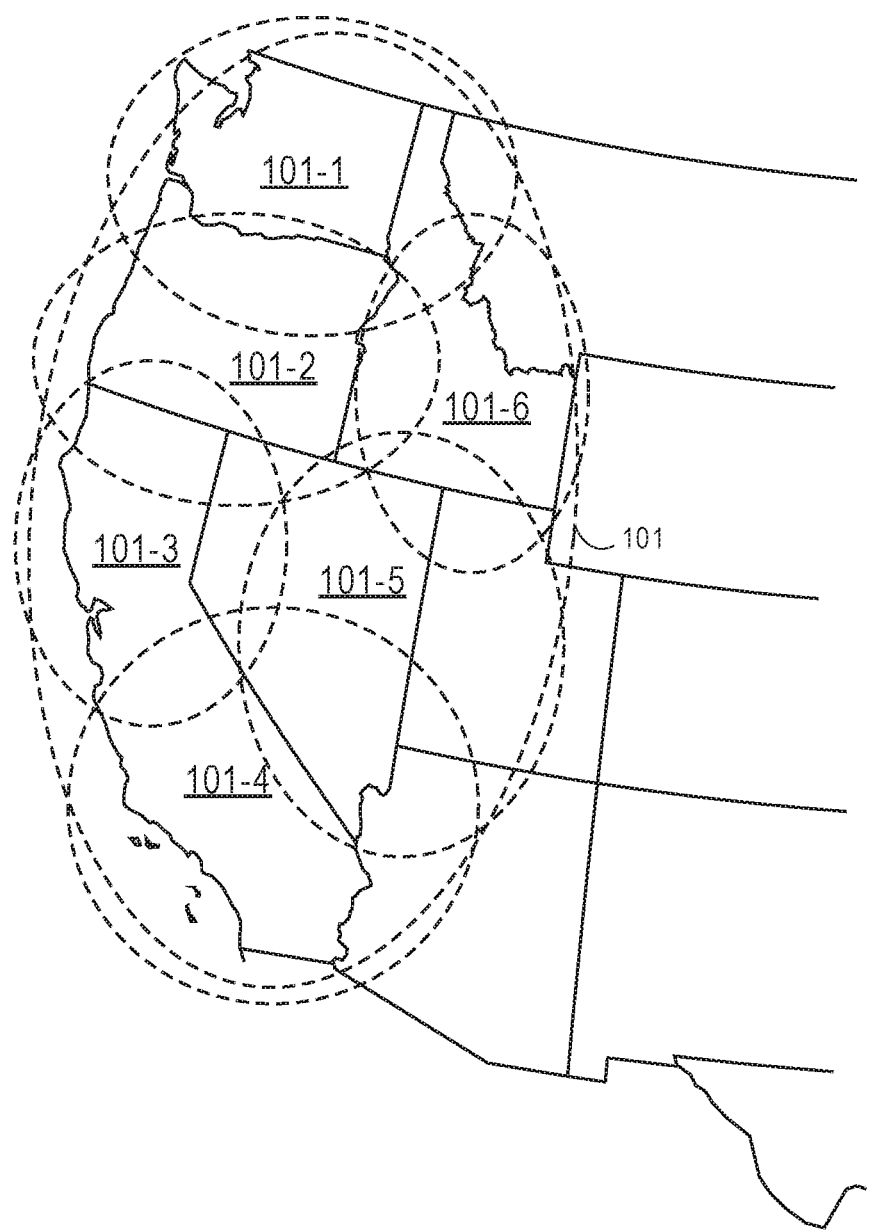
FIG. 2 is a view of the west coast of the United States of America separated into sub-regions for vehicle notification management, according to an implementation.

FIG. 1 is a view of the United States of America, a service area 100, separated into regions for vehicle notification management, according to an implementation. In this example, the service area 100 is separated into six regions 101, 103, 105, 107, 109, and 111. It will be appreciated that in other configurations a service area may have fewer or additional regions. Likewise, adjacent regions may at least partially overlap, as illustrated. To form the hierarchical regions, one or more of the six regions 101, 103, 105, 107, 109, and 111 of the service area may be further divided into two or more sub-regions. For example, FIG. 2 provides an illustration of the west coast region 101 (which corresponds to region 101 in FIG. 1) divided into six sub-regions 101-1, 101-2, 101-3, 101-4, 101-5, and 101-6. Like the regions illustrated in FIG. 1, it will be appreciated that in other configurations, a region may be divided into fewer or additional sub-regions. Likewise, the sub-regions may cover the same or different portions of the region 101. For example, one sub-region may be larger than a second sub-region. Likewise, adjacent sub-regions may overlap.

Figure 3:
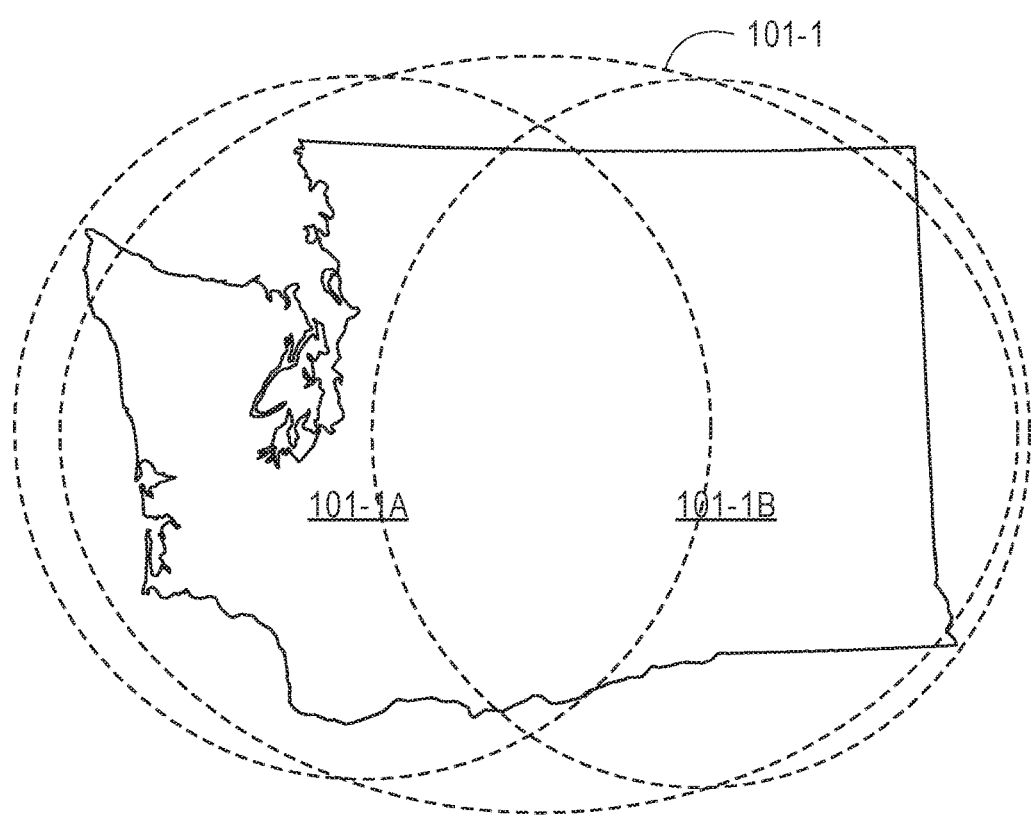
FIG. 3 is a view of Washington State separated into sub-sub-regions for vehicle notification management, according to an implementation.

Continuing further, one more sub-regions of an area may be further separated into two or more sub-sub-regions. For example, FIG. 3 provides an illustration of the Washington state sub-region 101-1 (which corresponds to sub-region 101-1 in FIG. 2) divided into two sub-sub-regions 101-1A and 101-1B. Like the regions illustrated in FIG. 1 and the sub-regions illustrated in FIG. 2, it will be appreciated that in other configurations, a sub-region may be divided into fewer or additional sub-sub-regions. Likewise, the sub-sub-regions may cover the same or different portions of the sub-region 101-1. For example, one sub-sub-region may be larger than a second sub-sub-region. Likewise, adjacent sub-sub-regions may overlap, as illustrated.

In the described implementations, a service area may be separated into any number of regions and the hierarchy within those regions may include any number and depth of sub-regions. Likewise, regions may have any size and/or shape. A region, as used herein, refers to any segment of a service area. Generally, a region may be at any level within a hierarchy.

Other forms or structures of hierarchal reference systems may be utilized instead of the example discussed above with respect to FIGS. 1-3. For example, the standardized geo-spatial reference system known as the Global Area Reference System (GARS) may be utilized with the implementations discussed herein. In the GARS system, the surface of the earth is divided into 30-minute by 30-minute cells, each of which are identified by a five-character designation (e.g., 006AG). The first three characters designate a 30-minute wide longitudinal band and the fourth and fifth character designate a 30-minute wide latitudinal band. The hierarchical structure of GARS is such that each 30-minute cell (a region) is divided into four 15-minute by 15-minute quadrants (sub-regions). Each quadrant within a cell is number sequentially, from west to east, starting with the northernmost band. Each quadrant may thus by identified by a six-character designation (e.g., 006AG3).

The hierarchical structure further continues in that each 15-minute quadrant is divided into nine 5-minute by 5-minute areas (sub-sub-regions). Each of the nine areas are also numbered sequentially, from west to east, starting with the northernmost band and each area may be identified by a seven-character designation (e.g., 006AG39).

Regardless of the hierarchal reference system utilized, agents may subscribe to receive notifications relevant to different regions and/or send notifications to different regions. Based on the hierarchy, notifications are delivered only to regions corresponding to a region designated for the notification. For example, referring back to FIG. 3, if a notification is designated for sub-sub-region 101-1A, the notification will be sent to subscribers of sub-sub-region 101-1A, subscribers of sub-region 101-1, and subscribers of region 101 (FIG. 2) because the notification is relevant to all of those regions. However, subscribers of sub-sub-region 101-1B, sub-regions 101-2, 101-3, 101-4, 101-5, and 101-6, and regions 102, 103, 104, 105, and 106 (FIG. 1) will not receive the notification because they are not within the same hierarchy designation as the designated region 101-1A. In comparison, if a notification is designated to region 101, the notification will be sent to subscribers of region 101, sub-region 101-1 and 101-2, 101-3, 101-4, 101-5, and 101-6, and any regions within those sub-regions, such as sub-sub-regions 101-1A and 101-1B. The notification will not be sent to subscribers of regions 102, 103, 104, 105, and 106 because those regions are not within the same hierarchy designation as the designated region 101. As another example, if a notification is designated for the service area 100, the notification will be sent to all subscribers because all regions are within the service area 100.

In some implementations, an agent may only subscribe to one region. In other implementations, an agent may subscribe to multiple regions within a service area and thus may receive notifications for different hierarchy designations.

By specifying designations and allowing agents to subscribe/unsubscribe to different hierarchies, notification delivery can be greatly reduced by only sending notifications to agents subscribed to particular regions, rather than to all agents. Likewise, by allowing agents to subscribe and unsubscribe, as agents, such as vehicles move between regions, those agents can subscribe to only those regions in which they are operating and/or have interest, such as regions adjacent to the agent's area of operation, or regions into which the agent is traveling.

Figure 4:
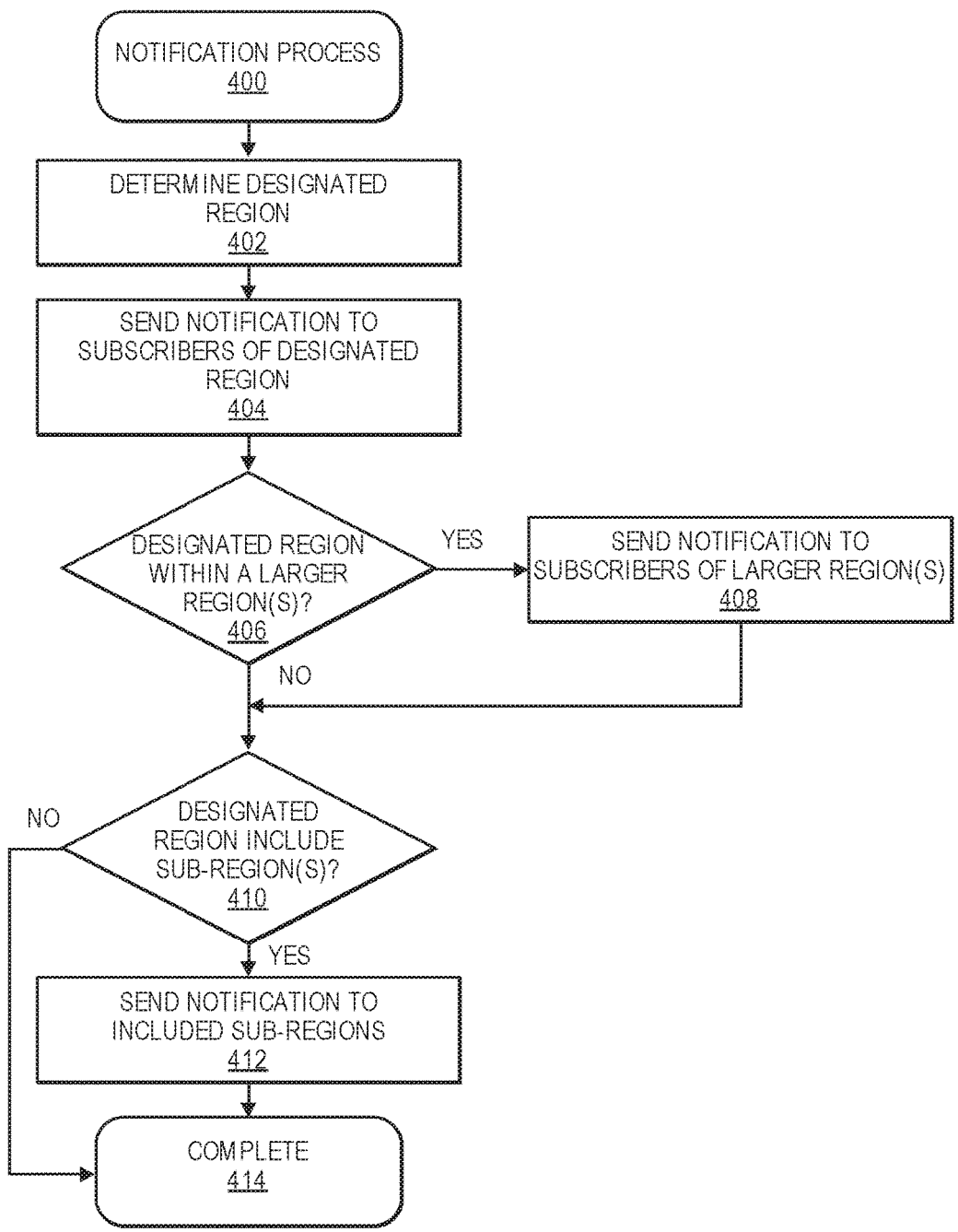
FIG. 4 is a flow diagram of an example notification process, according to an implementation.

FIG. 4 is a flow diagram of an example notification process 400, according to an implementation. This process, and each process described herein, may be implemented by the architectures described herein or by other architectures. The process is illustrated as a collection of blocks in a logical flow graph. Some of the blocks represent operations that can be implemented in hardware, software, or a combination thereof. In the context of software, the blocks represent computer-executable instructions stored on one or more computer readable media that, when executed by one or more processors, perform the recited operations. Generally, computer-executable instructions include routines, programs, objects, components, data structures, and the like that perform particular functions or implement particular abstract data types.

The computer readable media may include non-transitory computer readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer readable media may include a transitory computer readable signal (in compressed or uncompressed form). Examples of computer readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 400 begins by determining a designated region for a notification, as in 402. A notification may be any communication that is to be sent to subscribers of one or more regions within a service area. The notification may be generated by an agent (e.g., controller, aerial vehicle), another entity associated with the service area, and/or by an entity (e.g., user) not associated with the service area.

The designated region for a notification may be a region at any level within a hierarchal reference system associated with a service area. As discussed above, agents may subscribe and unsubscribe to different regions. Accordingly, a subscriber list may be maintained that indicates all agents subscribed to a particular region. As new agents subscribe to the region or subscribed agents unsubscribe from the region, the subscriber list for that region may be updated.

Utilizing the subscriber list for the designated region, the notification is send to all agents indicated on the subscriber list for the designated region, as in 404. In addition to sending the notification to subscribers of the designated region, a determination is made as to whether the designated region is within a larger region, as in 406. A designated region will be within a larger region if the designated region is a sub-region of another region. Likewise, a region may be within multiple larger regions. For example, a sub-sub-region is within a sub-region and a corresponding region. To illustrate, referring briefly back to FIG. 3, sub-sub-region 101-1A is within sub-region 101-1 and within region 101.

If it is determined that the designated region is within one or more larger regions, the notification is sent to agents subscribed to those larger regions. Continuing with the above example, if the notification designates sub-sub-region 101-1A, the notification would be sent to agents subscribed to sub-sub-region 101-1A, agents subscribed to sub-region 101-1, and agents subscribed to region 101. In comparison, the notification will not be sent to agents subscribed to sub-region 101-2 or regions 102, 103, 104, 105, and 106, unless one of those agents is also subscribed to sub-sub-region 101-1A, sub-region 101-1, or region 101. In addition to sending the notification to agents subscribed to a larger region, or if it is determined that the designated region is not within a larger region, a determination is made as to whether the designated region includes one or more regions, as in 410. A designated region is considered to include a region if that region is within the designated region (i.e., a sub-region). For example, sub-region 101-1 is within region 101 and sub-sub-region 101-1A is also within region 101 (and within sub-region 101-1).

If it is determined that the designated region includes one or more regions, the notification is sent to agents subscribed to those included regions, as in 412. Upon sending the notification to agents subscribed to any included regions or if it is determined at decision block 410 that the designated region does not include any other regions, the example process 400 completes, as in 414.

By allowing agents to subscribe/unsubscribe to different regions and only sending notifications to subscribers of regions within a hierarchy of a region designated for a notification, the total data transmitted through the system is greatly reduced. Likewise, the processing required by agents to determine if a received notification is relevant to the agent is reduced as agents only receive notifications that are designated to a region within a hierarchy to which they are subscribed. For example, as an agent, such as an aerial vehicle, navigates between regions, the agent may unsubscribe from a region the agent is departing, and subscribe to a region the agent is entering. Likewise, the agent may send a notification to the region the agent is entering and the notification will be received by other agents subscribed to that region. For example, as the agent enters and subscribes to a region, the agent may send a notification that includes a hash value corresponding to a path associated with the agent. Other agents, such as a controller subscribed to the region designated for the notification, will receive the notification and can process the information included in the notification.

Figure 5:
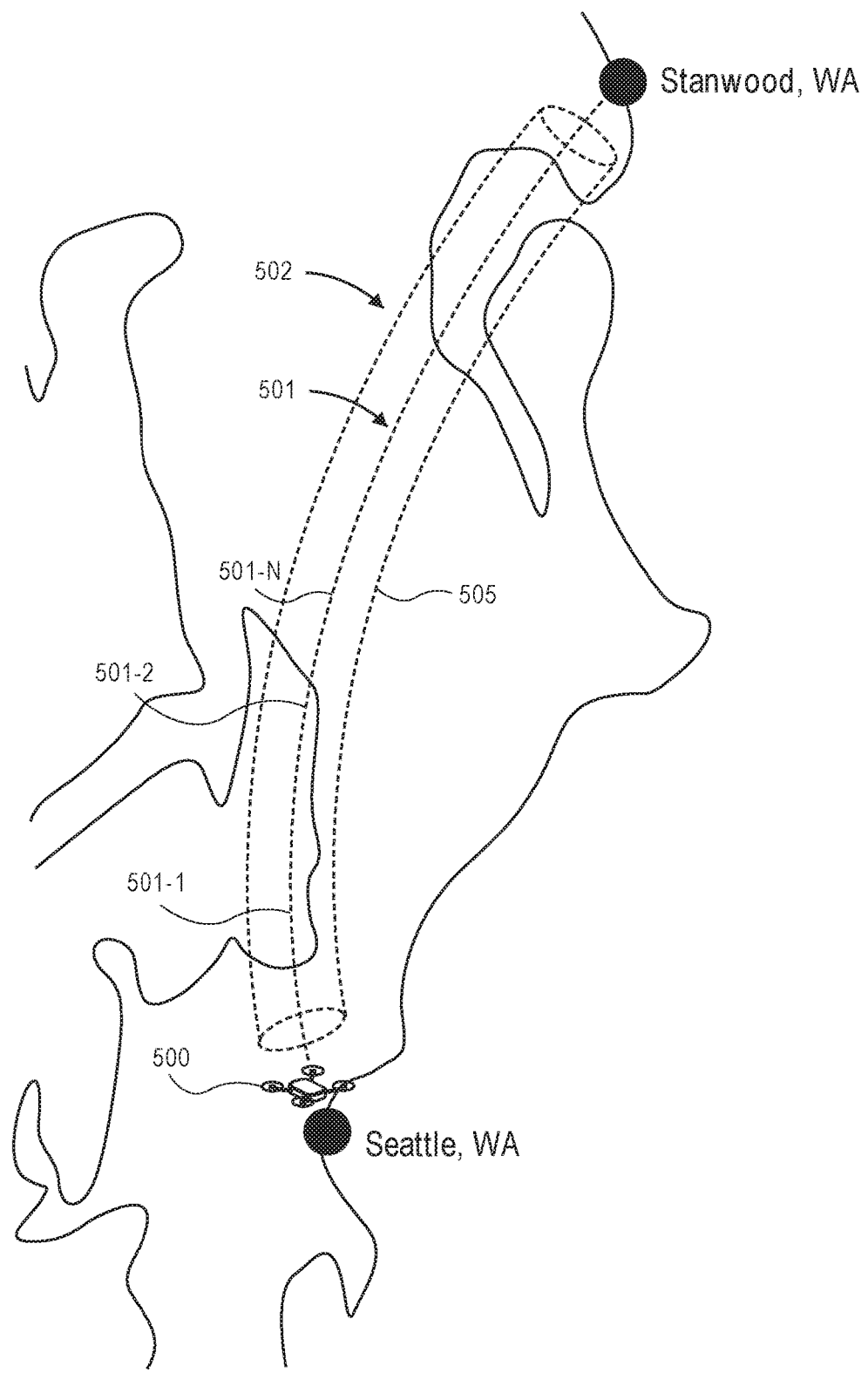
FIG. 5 is a view of an aerial vehicle and a path between a source location and a destination location, according to an implementation.

As discussed in further detail herein, agents that are navigating within a service area, such as aerial vehicles, ground based vehicles, water based vehicles, unmanned aerial vehicles, unmanned ground based vehicles, and/or unmanned water based vehicles, may be associated with a path that is planned for the vehicle. For example, FIG. 5 is a view of an aerial vehicle 500, such as a UAV, and a path 501 between a source location and a destination location that is planned for the aerial vehicle 500, according to an implementation. A path, as used herein, is a series of segments or data points, such as path data points 501-1, 501-2 . . . 501-N that specify information about the path from a source location, such as Seattle, Wash., to a destination location, such as Stanwood, Wash., over a period of time. Each path data point is represented by data specific to that path and all path data points together form a path for an aerial vehicle. For example, a path data point may include, for a specific period of time between a start time ($t_0$) and a completion time ($t_N$) an altitude of the aerial vehicle at the time, a pose of the aerial vehicle at the time, a heading of the aerial vehicle at the time, an x-position of the aerial vehicle at the time, a y-position of the aerial vehicle at the time, a z-position of the aerial vehicle at the time, a velocity of the aerial vehicle at the time, a pitch of the aerial vehicle at the time, a yaw of the aerial vehicle at the time, a roll of the aerial vehicle at the time, an angular velocity of the aerial vehicle at the time, an allowed deviation from the path, a planned silhouette or shape of the aerial vehicle at the time, etc.

The allowed deviation, represented by the tube 502 that surrounds the path 501 indicates an allowable degree or amount of deviation from the path data points that may result as the aerial vehicles navigates the path due to, for example, external forces (e.g., wind) acting on the aerial vehicle. The allowed deviation may be the same or different for different agents and/or at different points along the path. For example, large aerial vehicles may have a larger allowable deviation than smaller, more agile aerial vehicles. As another example, aerial vehicle will less capabilities or sensors may be assigned a larger allowable deviation. In still other examples, the allowed deviation may vary based on the weather conditions. For example, during high winds, the allowed deviation from the path may be larger. The allowable deviation may be used by other agents, such as controllers in computing additional paths in that those additional paths are to avoid existing paths by at least the allowable deviation.

The planned silhouette or shape of the aerial vehicle may indicate a size or shape of the aerial vehicle at different points during the path. For example, if the aerial vehicle includes an arm, camera, or other object that may be extended or retracted from the frame of the aerial vehicle, the planned silhouette of the aerial vehicle may vary along the path depending on the position of the object that may be extended or retracted.

A path is defined by path data that may include millions of path data points or segments that may maintained in a path table and representative of the path. The path table may be maintained in a data store that is accessible to the agents of the service area. For example, a path table may include a row representative of each point in time between $t_0$ and $t_N$ for a path and each column may correspond to one item of data for each path data point. Accordingly, each path for each vehicle is represented by a table that may include hundreds, or millions of path data points, each represented by a row of data in a path table maintained in a path table data store that is accessible by other agents.

Agents that have access to the path data store may be related or independent. For example, a first company, Company A, may have six controllers in a service area, each associated with a different region and each controller may be configured to manage one or more (or thousands) of other agents, such as aerial vehicles operated by Company A. Likewise, a second company, Company B, which may be independent of Company A, may have three controllers within the same service area and each of those controllers may be configured to manage one or more other agents, such as aerial vehicles operated by Company B. Each of those agents may be configured to access the same path data stores and/or subscribe/unsubscribe to the same hierarchy regions within the service area.

To facilitate communication among agents, and reduce the amount and volume of notifications, a hash function may be used to produce a unique hash value for each path that is maintained in the path data store. As is known in the art, a hash function is any function that can be used to map data of arbitrary size, such as a path table, to data of a fixed size, known as a hash value, hash code, or simply a hash. A geometric hash function, deterministic hash function, or other form of hash function may be utilized to form hash values from the path data.

By computing hash values for all paths and maintaining the path tables in a path data store accessible by agents, any agent having knowledge of the hash function can independently determine the path for any other agent in the service area, without having to directly transmit or receive communications from that agent. For example, an agent may enter a region, send a notification that includes a hash value representative of a path associated with that agent and another agent, such as a controller in that region, can receive the hash value and independently determine, based on the hash value, the path for the agent that sent the notification. As another example, when an aerial vehicle managed or operated by a first controller enters an area of operation of a second controller, or the path includes navigation into an area of operation of a second controller, the first controller may send to the second controller the hash value representative of the path for that aerial vehicle.

Paths may be used by agents to reconstruct the entire space-time history of a region, for collision avoidance, route planning, monitoring of other agents, control, logistics, etc. For example, a controller may be responsible for thousands of aerial vehicles within a region (area of operation). Likewise, there may be thousands of other vehicles within that area that are managed by other controllers. The controller may utilize the hash values to determine the paths within the region to ensure that no collisions may occur, to plan new paths, to determine if a vehicle needs to be assigned to a new or altered path, etc.

Figure 6:
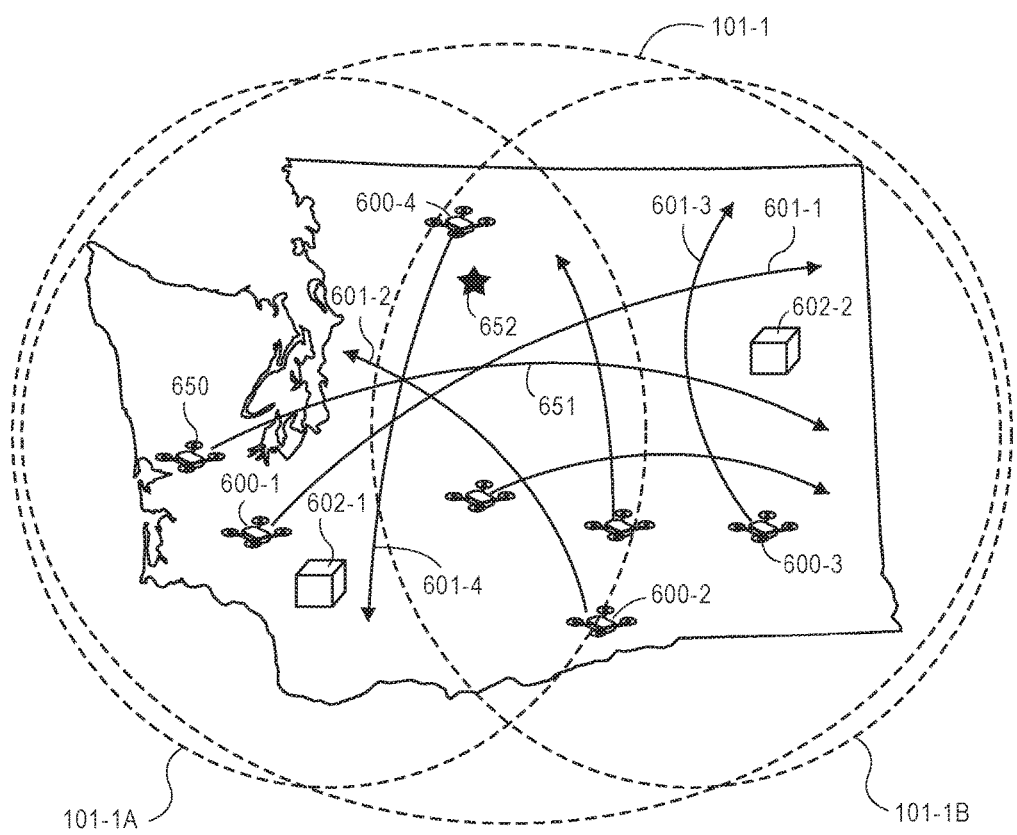
FIG. 6 is a view of Washington state and paths between source locations and destination locations for a plurality of aerial vehicles, according to an implementation.

FIG. 6 is a view of Washington state (a sub-region) and paths between source locations and destination locations for a plurality of aerial vehicles 600, according to an implementation. Similar to the discussion above, the sub-region 101-1 is divided into two sub-sub-regions 101-1A and 101-1B. Within sub-sub-region 101-1A there is a controller 602-1 that is configured to manage operation of each of the aerial vehicles within that sub-sub-region 101-1A. For example, the controller 602-1 may manage operation of aerial vehicles 600-1 and 600-4, as well as possibly thousands more aerial vehicles within that sub-sub-region. Likewise, there may be other controllers, such as controller 652 within the sub-region 101-1A that may be related to or independent of controller 602-1. Likewise, there may be other agents, such as aerial vehicle 650 that are operated by the other controller 652.

Likewise, controller 602-2 may be positioned in sub-sub-region 101-1B and configured to manage operation of aerial vehicles within sub-sub-region 101-1B, such as aerial vehicles 600-2 and 600-3, and potentially thousands more. As discussed above, each area vehicle is configured to navigate according to a path 601. For example, aerial vehicle 600-1 corresponds to path 601-1 and will navigate along that path. Aerial vehicle 600-2 corresponds to path 601-2 and will navigate along that path. Aerial vehicle 600-3 corresponds to path 601-3 and will navigate along that path. Aerial vehicle 600-4 corresponds to path 601-4 and will navigate along that path. Aerial vehicle 650 corresponds to path 651 and will navigate along that path.

The path data corresponding to each path is maintained in a path data store accessible to each agent (e.g., controller and/or aerial vehicle) and each path may be represented by a hash value that is computed using a hash function known to each agent. In some implementations, the paths and hash values may be determined and computed by the controllers and the path data stored in a path data store by the controllers. Likewise, the controllers may send the computed hash values to the aerial vehicles alone or in combination with the path data for that aerial vehicle and/or the controllers may exchange or provide hash values to other controllers. For example, controller 602-1 may determine a path 601-1 for aerial vehicle 600-1 and compute a hash value for that path using a hash function known to the other controllers 602-2 and 652 and/or known to the other aerial vehicles 600. The computed path may be determined by the controller 602-1 based on the paths associated with other aerial vehicles within the area. The controller 602-1, upon determining the path 601-1 for the aerial vehicle 600-1 and computing a hash value may, in addition to storing the path data in a path data store, may provide the hash value to controller 606-2.

As another example, the controller 602-1 may determine that aerial vehicles 650, 600-4, etc. have paths within the sub-sub-region 101-1A, obtain the hash values for those paths and obtain the respective path data from the path data table. Utilizing the path data for those paths, a path 601-1 can be planned for the aerial vehicle 600-1. Likewise, the controller 602-1 may receive a notification as aerial vehicle 600-2 enters the sub-sub-region 101-1A and that notification may include a hash value for the path 601-2 for that aerial vehicle 600-2. The controller 602-1 may then lookup the path for the aerial vehicle using the hash value and consider the path 601-2 as a factor in computing the path 601-1 for the aerial vehicle 600-1.

This process of monitoring, planning paths, and/or altering paths may be continuously or periodically performed as aerial vehicles navigate within the service area or the region. By utilizing hash values to represent the path data, the amount of transmitted data is greatly reduced and agents can independently obtain information about other agents without direct communication.

Figure 7:
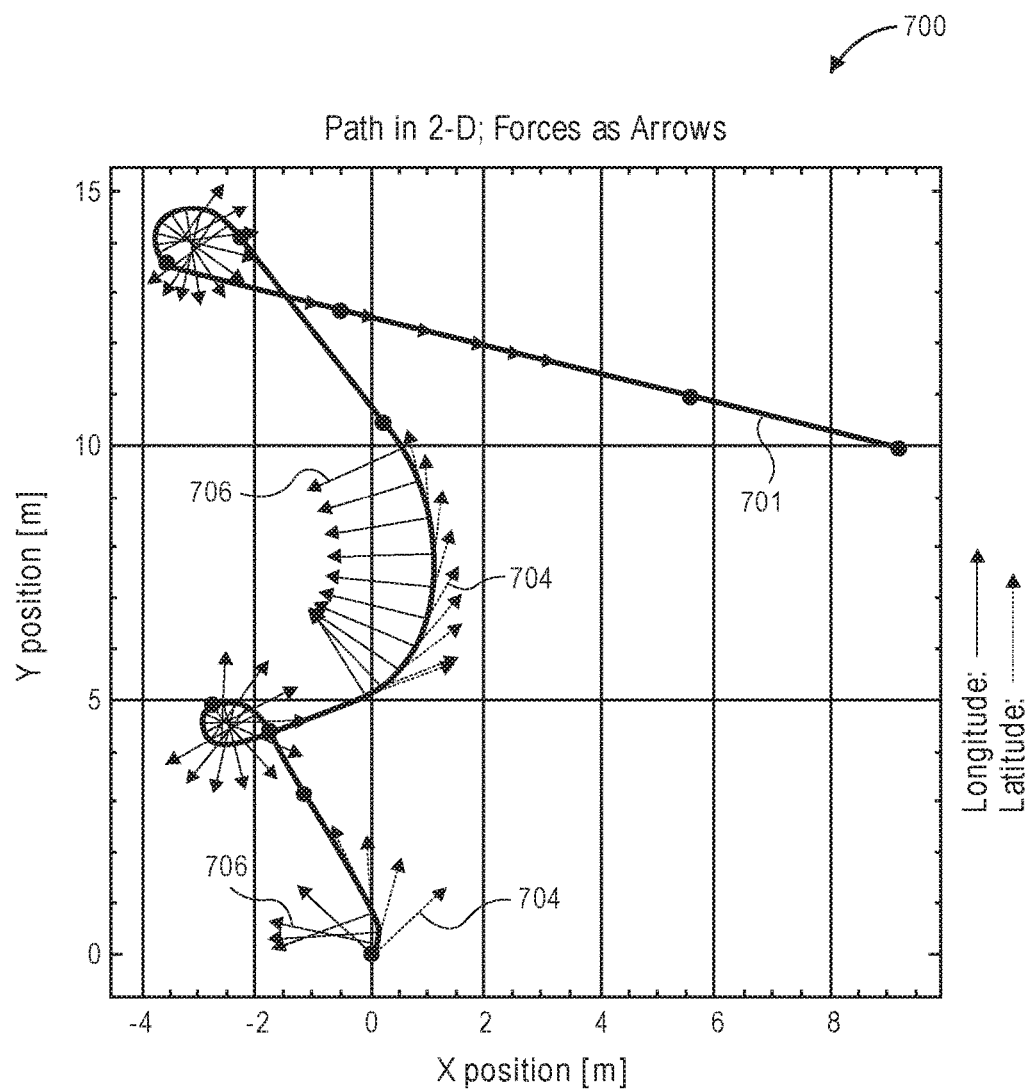
FIG. 7 is a graph view of a flight path of an aerial vehicle indicating forces imposed on the aerial vehicle by its propulsion system, according to an implementation.
Figure 8A:
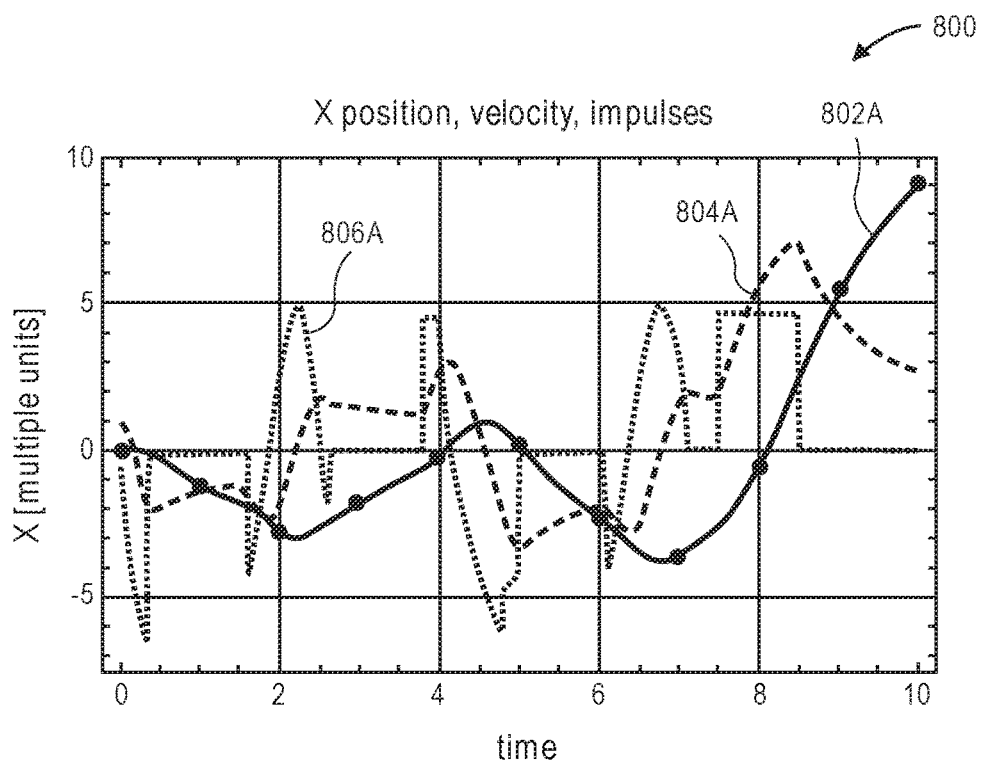
FIG. 8A is a graph view of the horizontal position, velocity, and forces acting on an aerial vehicle over a period of time, according to an implementation.
Figure 8B:
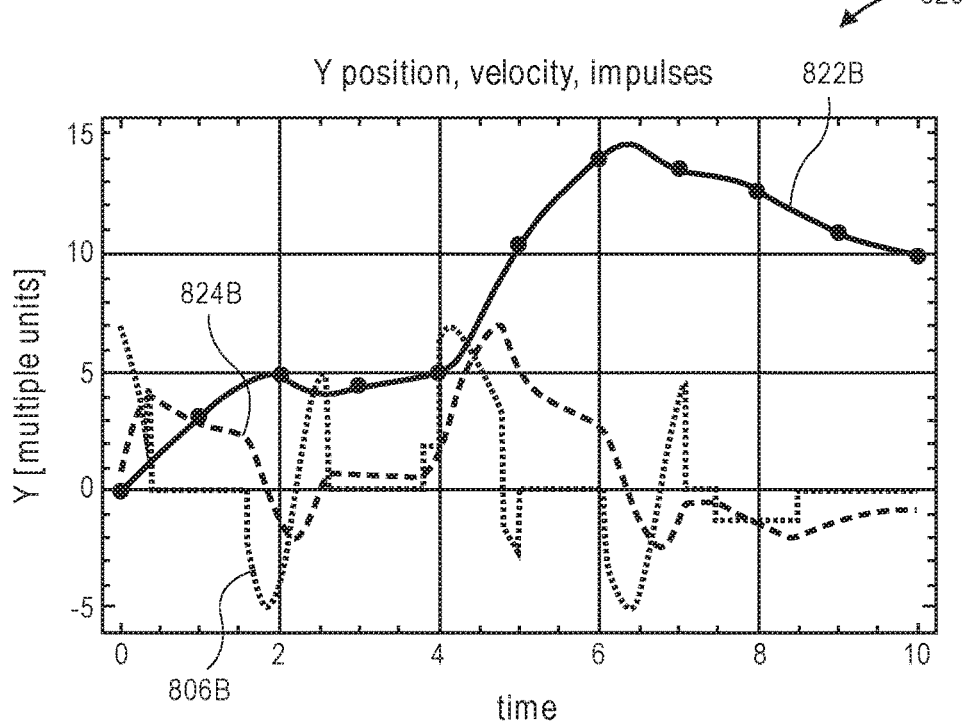
FIG. 8B is a graph view of the vertical position, velocity, and forces acting on an aerial vehicle over a period of time, according to an implementation.

FIGS. 7, 8A, and 8B provide graphical views of path data that may be included in a path. Specifically, FIG. 7 is a graph view 700 of a path 701 of an aerial vehicle indicating forces imposed on the aerial vehicle by its propulsion system, according to an implementation. For ease of discussion, the graph of forces is presented in two dimensions (longitude, latitude) with the path projected onto a surface, such as the ground. The solid arrows 706 represent longitudinal forces and the dashed arrows 704 represent latitudinal forces imposed upon the aerial vehicle by the aerial vehicle's propulsion system as the aerial vehicle navigates along the path 701. These forces may each be represented as path data points along the path 701 as individual rows in a path table and represent the planned method for navigating the aerial vehicle between a source location and a destination location (or between waypoints).

FIG. 8A is a graph view 800 of the horizontal position 802A, velocity 804A, and forces 806A acting on an aerial vehicle over a period of time along a path, according to an implementation. FIG. 8B is a graph view 820 of the vertical position 820A, velocity 822B, and forces 826B acting on an aerial vehicle over a period of time along a path, according to an implementation.

The simplified model illustrated in FIGS. 7, 8A, and 8B provide an example graphical view of path data that may be included in a path table to specify a path for an aerial vehicle. The following Table 1 is an example table view of a path data point for the simplified path represented in FIGS. 7, 8A, and 8B:

TABLE 1

| Quantity | Value |
|---|---|
| $X_0$ | 0 |
| $Vx_0$ | 1 |
| $Y_0$ | 0 |
| $Vy_0$ | 1 |
| Longitude Force ctr times | $\begin{pmatrix} -2.95161 \\ 4.29158 \\ -5.78817 \\ -0.13992 \\ 7.98178 \end{pmatrix}$ |
| Latitude Force ctr times | $\begin{pmatrix} -1.32496 \\ 4.29158 \\ -0.165728 \\ 4.47936 \\ 6.56648 \end{pmatrix}$ |
| Hash | 5 770 798 171 259 987 513 |

The path data point represented in Table 1, a collection of multiple path data points, or all path data points as represented in the graphs discussed above with respect to FIGS. 7, 8A, and 8B may be hashed using a known has function to a defined length and short number that is effectively unique for the path. For example, the final row of Table 1 above, indicates a hash value for the path data represented in Table 1 hashed according to a known hash function. As will be appreciated, individual path data points, such as illustrated by Table 1 may be hashed using a hash function to generate a hash value. Likewise, groups of path data points for a path may be hashed using a hash function to generate a hash value representative of the group of path data points.

A controller, or other agent may utilize the hash value to lookup or determine the path data represented by the hash value and utilize the following equations of motion to reconstruct the path for the aerial vehicle:

$$mx'' = -\frac{1}{2}\rho C_d Ax' \sqrt{(x')^2 + (y')^2} + u_x(x, y, x', y', t)$$

$$my'' = -\frac{1}{2}\rho C_d Ay' \sqrt{(x')^2 + (y')^2} + u_y(x, y, x', y', t)$$

Where m is the mass (kilograms (kg)) of the vehicle, x and y are the position of the vehicle, p is the density of air (kg/meter$^3$), $C_d$ is the dimensionless coefficient of drag, A is the area presented to the wind (meter$^2$), u is the control force (Newtons), and t is time.

Figure 9:
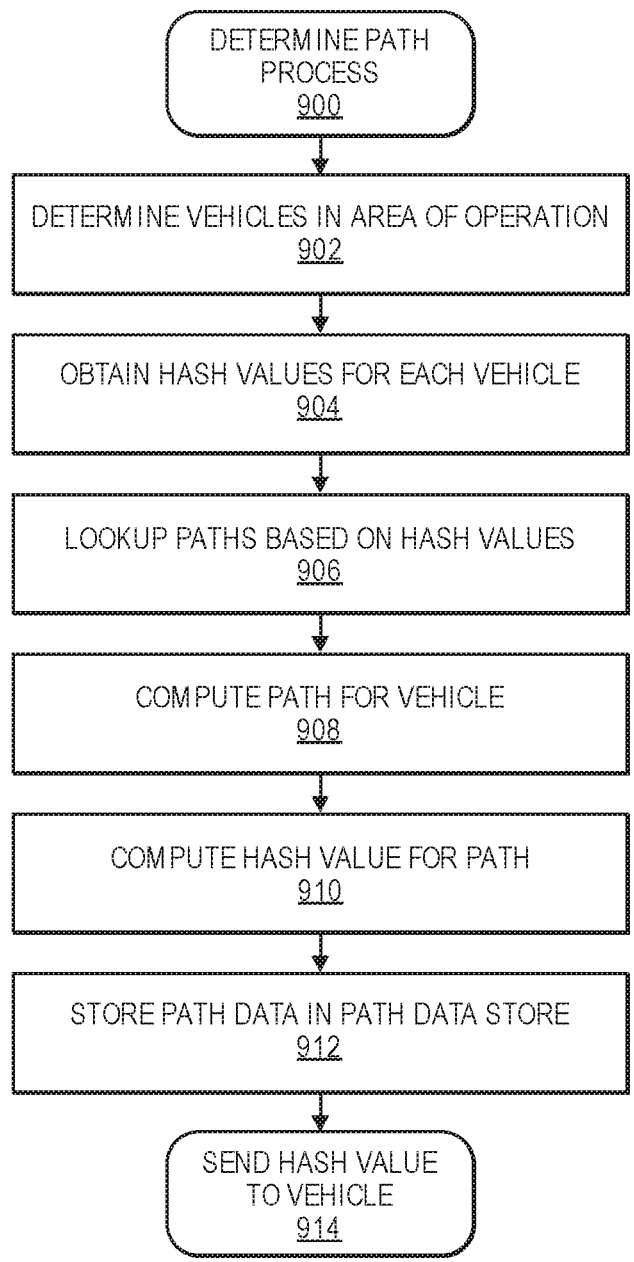
FIG. 9 is a flow diagram of an example process for determining a path for a vehicle, according to an implementation.

FIG. 9 is a flow diagram of an example process 900 for determining a path for a vehicle, according to an implementation. The example process 900 begins by determining vehicles in an area of operation, such as a region, sub-region, or sub-sub-region, as in 902. Vehicles in an area of operation may be determined by, for example, detecting a beacon or other signal transmitted by the aerial vehicles, monitoring position information of aerial vehicles in an area, receiving notifications from the aerial vehicles, etc.

For each aerial vehicle within the area of operation, a hash value of obtained, as in 904. In some implementations, each aerial vehicle may periodically transmit a hash value representative of the path associated with the aerial vehicle. In other implementations, a controller configured to manage operation of the aerial vehicles may periodically transmit hash values for each of the aerial vehicles. In still other examples, a vehicle identifier may be determined and the example process 900 may determine corresponding hash values maintained in a hash list for aerial vehicles within the area of operation. In still other examples, the example process 900 may maintain a hash value list that includes a hash value for each vehicle that has been determined to be within the area of operation.

Utilizing the hash values, the example process accesses the path data store and looks up or obtains the path data represented by the obtained hash values, as in 906. As discussed above, each hash value may be computed based on a hash function and path data maintained in a path data store. The path data may be stored with the corresponding hash values and/or the hash values may be dynamically computed by the example process utilizing a known hash function and path data maintained in the path data store.

Based on the obtained paths for the aerial vehicles within the area of operation, a path for an aerial vehicle is determined, as in 908. For example, the example process 900 may determine a path for an aerial vehicle such that the path does not interfere with a path of another aerial vehicle operating in the area of operation so that there is no chance of collision between the vehicles. In some implementations, the path may be computed so that it does not intersect with any other paths. In other examples, the path for an aerial vehicle may be determined so that the path does not intersect with another path during a period of time when the aerial vehicles are expected to be navigating along those intersecting portions of the paths.

As illustrated above, determining a path for an aerial vehicle includes, among other factors, determining forces acting upon the aerial vehicle as part of the operation of the aerial vehicle, altitude, velocity, angular velocity, etc. Upon determining the path data for each path data point along the path that is to be maintained, the example process 900 computes a hash value based upon the path data and a known hash function, as in 910. The hash value effectively uniquely identifies the path computed for the aerial vehicle.

The determined path data is also added to the path data store so that the path data is accessible by other agents (e.g., controllers, vehicles), as in 912. In some implementations, the path data may be stored along with the computed hash value. In other implementations, the path data may not be stored with the hash value and any hash values may be dynamically computed by an agent using the stored path data and the known hash function.

Finally, the hash value is sent to the aerial vehicle that is to navigate along the determined path, as in 914. In some implementations, the hash value is sent along with the path data, or a portion thereof so that the aerial vehicle can begin navigating along the path. In other implementations, only the hash value may be provided to the aerial vehicle and the aerial vehicle may access the path data store to obtain the path data, or a portion thereof, based on the received hash value.

Figure 10:
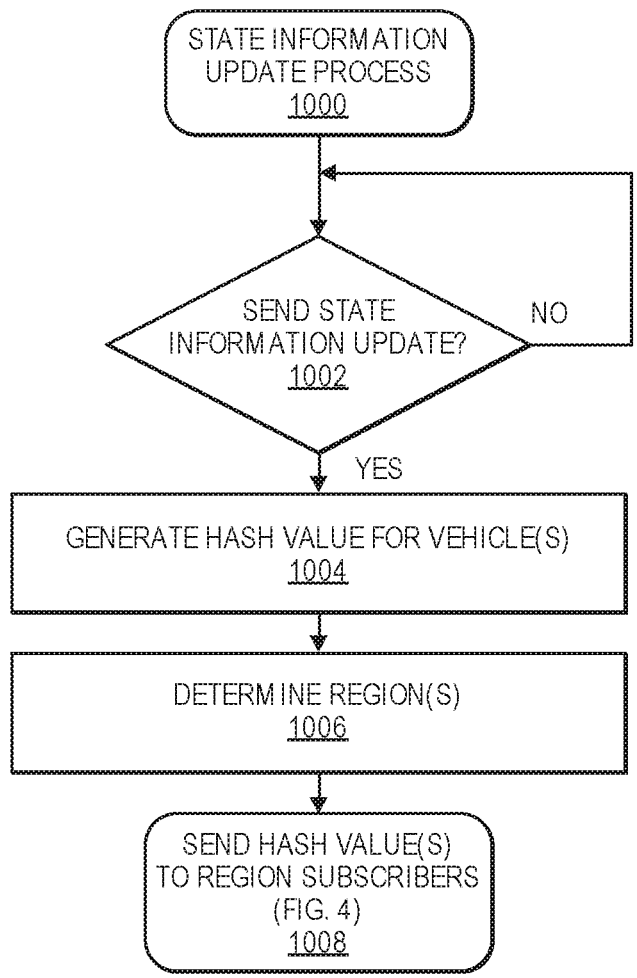
FIG. 10 is a flow diagram of an example state information update process, according to an implementation.

FIG. 10 is a flow diagram of an example state information update process 1000, according to an implementation. The example process may be performed by any agent (e.g., controller, vehicle). For example, a controller may perform the example process 1000 to provide state information updates relating to aerial vehicles managed by the controller. In another example, the example process 1000 may be performed by an aerial vehicle. for example, an aerial vehicle may perform the example process each time it subscribes to a new region, each time it enters or exits a region, and/or each time it receives instructions to alter paths.

The example process 1000 begins by determining if a state information update is to be sent to other agents within a service area, or within a region, sub-region, or sub-sub-region, as in 1002. State information may be sent periodically, at defined period of time, upon detection of any change in path data maintained in the path data store (e.g., addition of a new path), etc. If it is determined that state information is not to be provided, the example process 1000 returns to block 1002 and continues until it is determined that state information is to be updated.

Upon determination that state information is to be updated, hash values for the paths associated with aerial vehicle(s) managed by the agent executing the example process 1000 are generated, as in 1004. Likewise, the regions(s) to which the state information update is to be provided is determined, as in 1006. For example, if an aerial vehicle is entering a new region, the agent managing the aerial vehicle may subscribe to the new region and determine that state information is to be provided to the new region. In another example, the region may be an area of operation managed by a controller.

Based on the determined region(s) that are to receive the state information updates, the example process sends the hash value(s) corresponding to the relevant aerial vehicles to all agents subscribed to the determined regions, as in 1008. Sending notifications, such as state information updates to regions, is discussed above with respect to FIG. 4.

Figure 11:
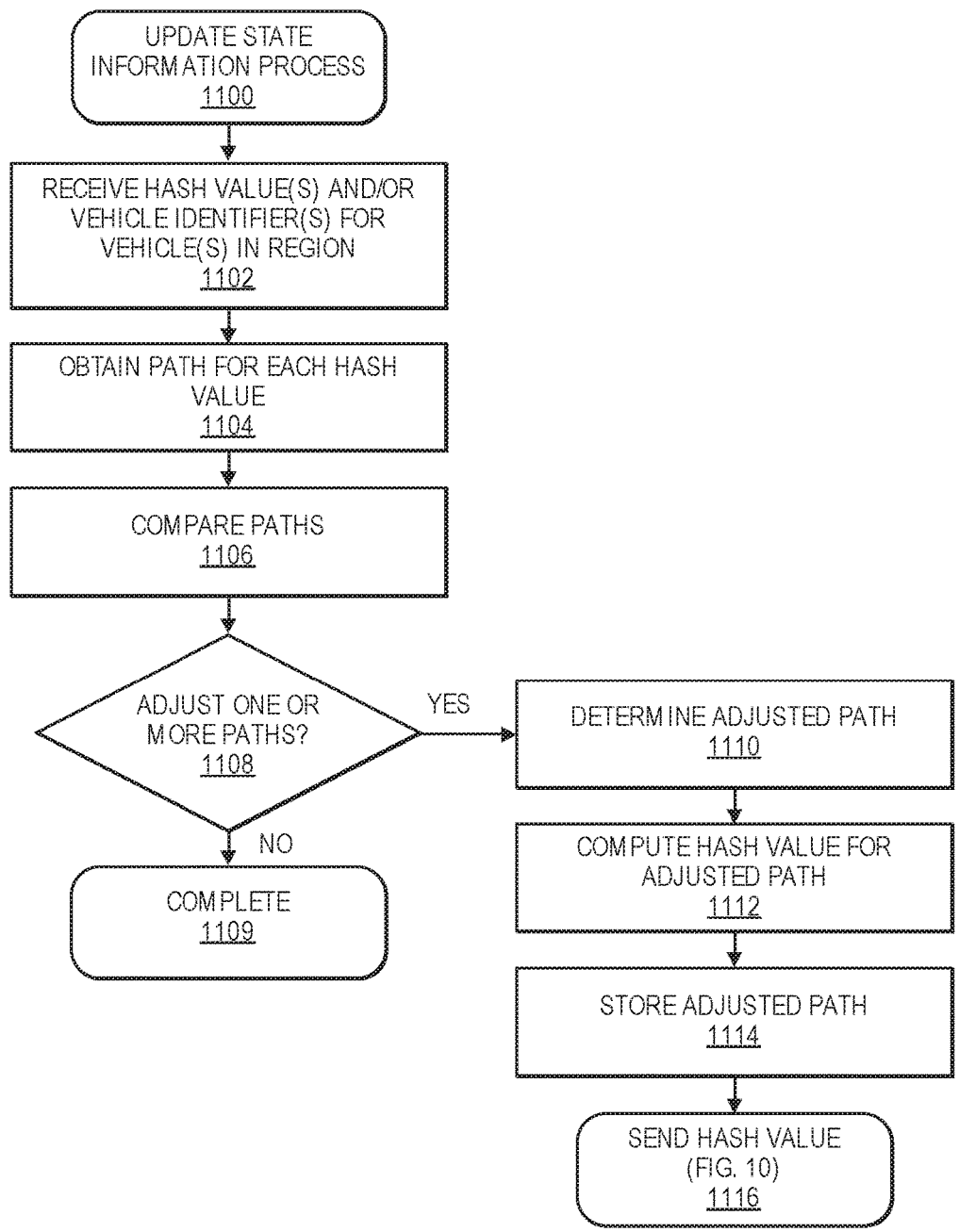
FIG. 11 is a flow diagram of an example update state information process, according to an implementation.

FIG. 11 is a flow diagram of an example update state information process 1100, according to an implementation. The example process 1100 may be performed by one or more controllers that are configured to manage one or more aerial vehicles. In other implementations, the example process 1100 may be performed by one or more aerial vehicles.

The example process 1100 begins upon receipt of one or more hash values and/or vehicle identifiers for vehicles within a region of operation, as in 1102. Hash values may be received from vehicles, controllers, etc. For example, using the notification process 400 (FIG. 4) a vehicle entering a region may generate and send a notification that includes a hash value representative of a path being navigated by the aerial vehicle.

Upon receipt of one or more hash values, the example process accesses the path data store and obtains path data corresponding to the received hash value(s), as in 1104. As discussed above, the path data store may maintain hash values with each path data maintained in the hash data store. In other examples, the path data maintained in the data store may be hashed by the example process 1100 using a known hash function to dynamically generate hash values for the stored paths.

Upon obtaining paths for each received hash value and/or with other paths for vehicles within an area of operation, the paths are compared as in 1106. For example, path data at path intersections may be compared to determine if there is a potential collision between the two aerial vehicles that are navigating the paths. In other implementations, it may be determined whether any paths cross.

Based on the path comparison a determination is made as to whether one or more paths followed by an aerial vehicle needs to be adjusted, as in 1108. As discussed above, it may be determined that a path is to be adjusted if compared paths intersect, intersect at particular points in time, etc. in addition to determining that a path is to be altered based on a comparison of other paths, a path may likewise be altered for other reasons. For example, if the destination for the vehicle navigating the path changes, it may be determined that the path is to be altered. Other examples that may result in path alteration include, but are not limited to, traffic congestions, weather conditions, traffic redistribution, mechanical problems with the vehicle, power availability of the vehicle, etc.

If it is determined that a path of an aerial vehicle needs to be adjusted, a new path, also referred to as an adjusted path, is determined, as in 1110. A new path or adjusted path may be a path that is independent of any other path and computed based on existing paths associated with and navigated by other aerial vehicles within the area of operation.

Upon determining an adjusted path, the adjusted path data is hashed using the known hash function to generate a hash value representative of the path data, as in 1112. The adjusted path data is also stored in the path data store so that it is accessible by all agents within the service area, as in 1114. Finally, as discussed above with respect to FIG. 10, the hash value representative of the adjusted path is sent to the aerial vehicle with instructions that the aerial vehicle alter course and begin navigating along the altered path, as in 1116.

Returning to decision block 1108, if it is determined that a path of an aerial vehicle operating within the region does not need to be adjusted, the example process 1100 completes, as in 1109.

Figure 12:
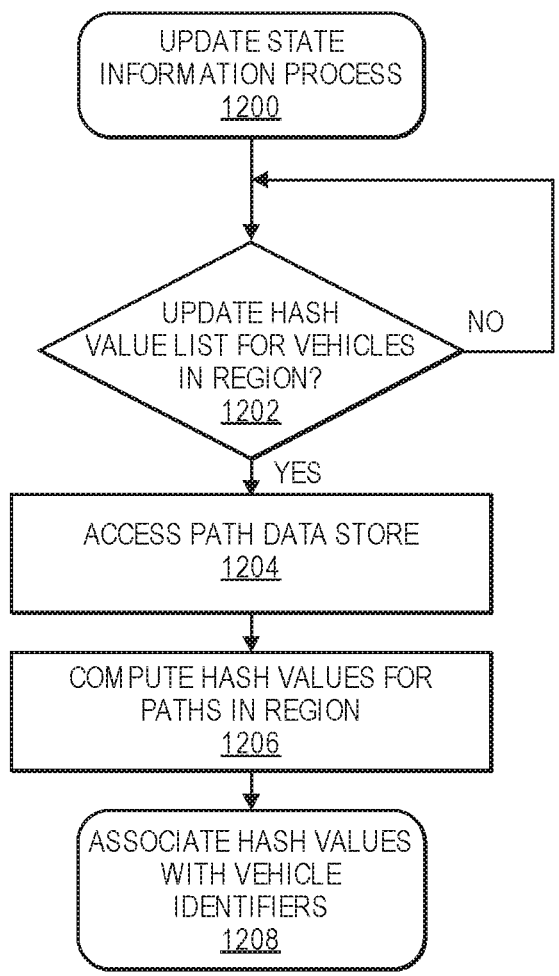
FIG. 12 is a flow diagram of another example update state information process, according to an implementation.

FIG. 12 is a flow diagram of another example update state information process 1200, according to an implementation. In this implementation, the system executing the example process 1200, such as a controller, maintains a hash value list that includes an identification of each vehicle within the area and a corresponding hash value representative of the path being navigated by the aerial vehicle.

The example process 1200 begins by determining if the hash value list for vehicles in the region is to be updated, as in 1202. It may be determined to update the hash value list in response to receiving a new hash value as part of a notification, in response to determining that a change has been made to the path data store, upon generation of a new path, or it may be determined that the hash value list is to be updated according to a defined schedule (i.e., periodically).

If it is determined that the hash value list is to be updated, the example process accesses the path data store to obtain path data for each aerial vehicle identified on the hash value list, as in 1204. In some implementations, the hash value list may correspond to and include all aerial vehicles subscribed to a particular region. In other implementations, the hash value list may include all aerial vehicles that have provided a notification that they are operating in the region.

Utilizing identifiers for the aerial vehicles included in the hash value list, path data associated with the aerial vehicle identifiers is determined and a hash function is computed from the path data, as in 1206. As each hash value is computed based on the current path data for an aerial vehicle as maintained in the path data store, the hash value list is updated to include the computed hash value, as in 1208. This example process 1200 may be repeated for each aerial vehicle indicated on the hash value list and/or may be performed for only those for which a path change has been detected.

By maintaining a separate hash value list for aerial vehicles in a region or area of operation, path data can be determined for the aerial vehicle by simply receiving or determining a vehicle identifier for the aerial vehicle, thereby further reducing the need for direct communication between agents. For example, an agent may detect a presence of an aerial vehicle and determine the aerial vehicle identifier based on, for example, a broadcast of information from the aerial vehicle that includes the aerial vehicle identifier, obtaining an image of the aerial vehicle and processing the image to determine a vehicle identifier indicated on the aerial vehicle, etc. Utilizing the aerial vehicle identifier, the path data store may be accessed to determine path information and/or a hash value representative of the path information corresponding to the vehicle identifier. A controller or other agent may then utilize the path information to determine collision risks with other aerial vehicles and/or whether other actions need to be performed with respect to the aerial vehicle.

Figure 13:
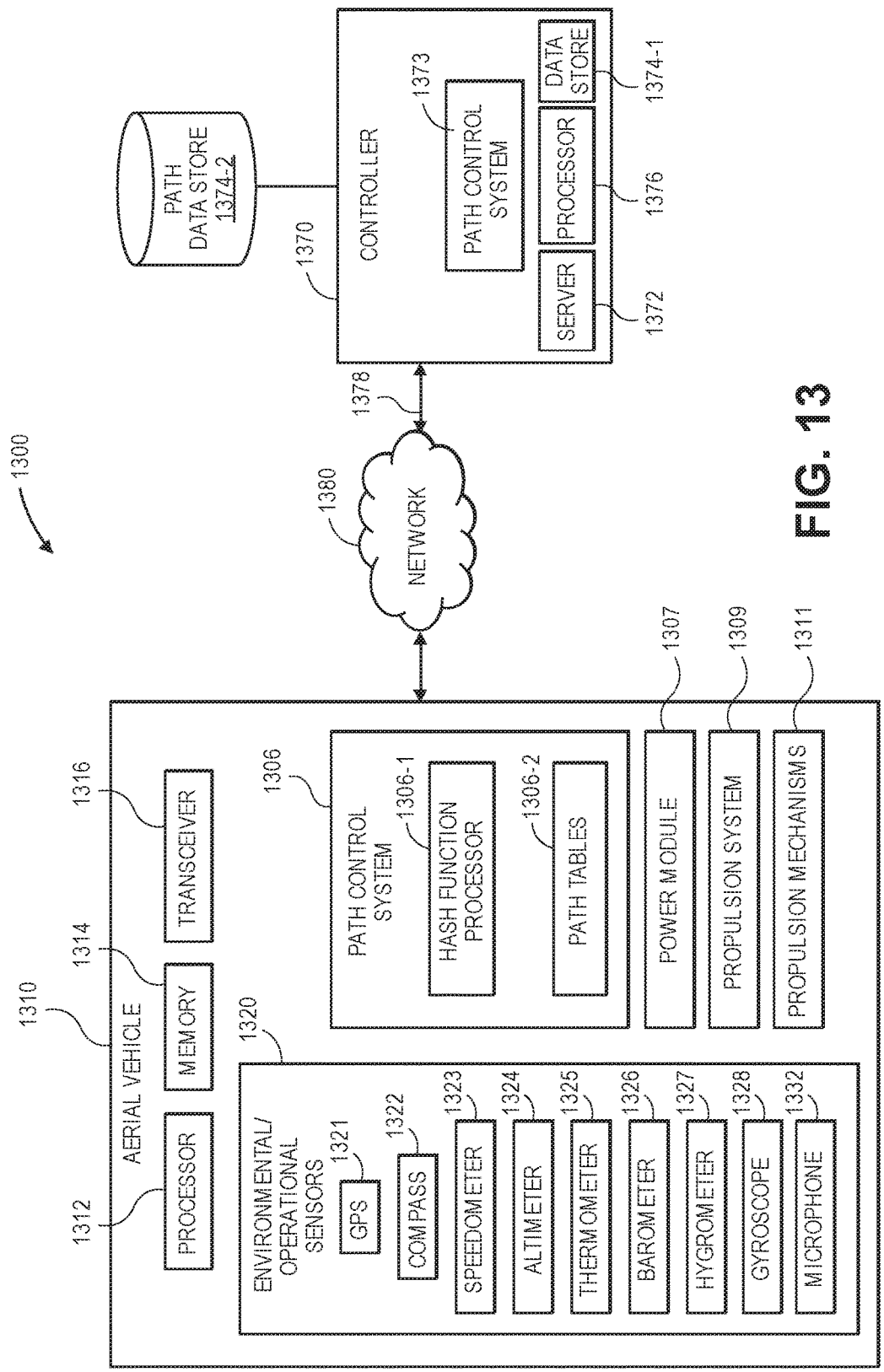
FIG. 13 is a block diagram of one system for vehicle management, according to an implementation.

Referring to FIG. 13, illustrated is a block diagram of components of one system 1300 for vehicle management, in accordance with an implementation. The system 1300 of FIG. 13 includes an aerial vehicle 1310 and at least one controller 1370 connected to one another over a network 1380. The aerial vehicle 1310 includes a processor 1312, a memory 1314 and a transceiver 1316, a power module 1307, a propulsion system 1309, as well as a plurality of environmental or operational sensors 1320 and a path control system 1306. The path control system 1306 may include hash function processor 1306-1 that is configured to compute a hash value for the aerial vehicle based on path information and/or process at least a portion of a received hash value, to determine for example, a path indicated by the hash value, a region in which the path value is located, an aerial vehicle associated with the hash value, etc. In some implementations, the path control system 1306 may also include a data store that maintains one or more path tables 1306-2. The path tables may be provided to the aerial vehicle over the network 1380 by one or more controllers, preloaded into the memory or other data store of the aerial vehicle, provided by other aerial vehicles, etc.

The processor 1312 may be configured to perform any type or form of computing function, including but not limited to the execution of one or more hash functions. For example, the processor 1312 may control any aspects of the operation of the aerial vehicle 1310 and the one or more computer-based components thereon, including but not limited to the transceiver 1316, the environmental or operational sensors 1320, the propulsion system 1309, and/or the path control systems 1306. The propulsion system 1309 may generate instructions for controlling and operating the propulsion mechanisms 1311 of the aerial vehicle (e.g., for operating one or more rotors, motors, rudders, ailerons, flaps or other propulsion mechanisms 1311). The propulsion system 1309 may be associated with one or more other computing devices or machines, and may communicate with the controller 1370 or one or more other computer devices over the network 1380, through the sending and receiving of digital data. The aerial vehicle 1310 further includes one or more memory or storage components 1314 for storing any type of information or data, e.g., instructions for operating the aerial vehicle, or information or data captured by one or more of the environmental or operational sensors 1320.

The propulsion mechanisms of the aerial vehicle 1310 may include one or more of propellers, motors, rudders, ailerons, flaps, wings, engines, fans, jets, turbojets, turbo fans, jet engines, and/or any other form of propulsion mechanism. The power module 1307 provides power to various components and systems of the aerial vehicle 1310. The power module 1307 may be in the form of battery power, solar power, gas power, super capacitor, fuel cell, alternative power generation source, or a combination thereof.

The transceiver 1316 may be configured to enable the aerial vehicle 1310 to communicate through one or more wired or wireless means, e.g., wired technologies such as Universal Serial Bus (or "USB") or fiber optic cable, or standard wireless protocols, such as Bluetooth® or any Wireless Fidelity (or "Wi-Fi") protocol, such as over the network 1380 or directly.

The environmental or operational sensors 1320 may include any components or features for determining one or more attributes of an environment in which the aerial vehicle 1310 is operating, or may be expected to operate, including extrinsic information or data or intrinsic information or data. As is shown in FIG. 13, the environmental or operational sensors 1320 may include, but are not limited to, a Global Positioning System ("GPS") receiver or sensor 1321, a compass 1322, a speedometer 1323, an altimeter 1324, a thermometer 1325, a barometer 1326, a hygrometer 1327, a gyroscope 1328, and/or a microphone 1332. The GPS sensor 1321 may be any device, component, system or instrument adapted to receive signals (e.g., trilateration data or information) relating to a position of the aerial vehicle 1310 from one or more GPS satellites of a GPS network (not shown). The compass 1322 may be any device, component, system, or instrument adapted to determine one or more directions with respect to a frame of reference that is fixed with respect to the surface of the Earth (e.g., a pole thereof). The speedometer 1323 may be any device, component, system, or instrument for determining a speed or velocity of the aerial vehicle 1310, and may include related components (not shown) such as pitot tubes, accelerometers, or other features for determining speeds, velocities, or accelerations.

The altimeter 1324 may be any device, component, system, or instrument for determining an altitude of the aerial vehicle 1310, and may include any number of barometers, transmitters, receivers, range finders (e.g., laser or radar) or other features for determining heights. The thermometer 1325, the barometer 1326 and the hygrometer 1327 may be any devices, components, systems, or instruments for determining local air temperatures, atmospheric pressures, or humidities within a vicinity of the aerial vehicle 1310. The gyroscope 1328 may be any mechanical or electrical device, component, system, or instrument for determining an orientation, e.g., the orientation of the aerial vehicle 1310. For example, the gyroscope 1328 may be a traditional mechanical gyroscope having at least a pair of gimbals and a flywheel or rotor. Alternatively, the gyroscope 1328 may be an electrical component such as a dynamically tuned gyroscope, a fiber optic gyroscope, a hemispherical resonator gyroscope, a London moment gyroscope, a microelectromechanical sensor gyroscope, a ring laser gyroscope, or a vibrating structure gyroscope, or any other type or form of electrical component for determining an orientation of the aerial vehicle 1310. The microphone 1332 may be any type or form of transducer (e.g., a dynamic microphone, a condenser microphone, a ribbon microphone, a crystal microphone) configured to convert acoustic energy of any intensity and across any or all frequencies into one or more electrical signals, and may include any number of diaphragms, magnets, coils, plates, or other like features for detecting and recording such energy. The microphone 1332 may also be provided as a discrete component, or in combination with one or more other components, e.g., an imaging device, such as a digital camera. Furthermore, the microphone 1332 may be configured to detect and record acoustic energy from any and all directions.

Those of ordinary skill in the pertinent arts will recognize that the environmental or operational sensors 1320 may include any type or form of device or component for determining an environmental condition within a vicinity of the aerial vehicle 1310 in accordance with the present disclosure. For example, the environmental or operational sensors 1320 may include one or more air monitoring sensors (e.g., oxygen, ozone, hydrogen, carbon monoxide or carbon dioxide sensors), infrared sensors, ozone monitors, pH sensors, magnetic anomaly detectors, metal detectors, radiation sensors (e.g., Geiger counters, neutron detectors, alpha detectors), altitude indicators, depth gauges, accelerometers or the like, as well as one or more imaging devices (e.g., digital cameras), and are not limited to the sensors 1321, 1322, 1323, 1324, 1325, 1326, 1327, 1328, 1332 shown in FIG. 13.

The controller 1370 includes one or more physical computer servers 1372 having a plurality of data stores 1374 associated therewith, as well as one or more computer processors 1376 provided for any specific or general purpose. For example, the controller 1370 of FIG. 13 may be independently provided for the exclusive purpose of receiving, determining, sending and/or storing paths for various vehicles and/or for computing hash functions for those paths. Any number of data stores 1374 may be included, such as data store 1374-1 and path data store 1374-2. As discussed above, each path for each aerial vehicle may be represented as a table having numerous rows and columns of data that represent different aspects of the path. For example, each row of the table may correspond to a time ($t_0$, $t_1$, $t_2$, $t_3$ . . . $t_N$) for the path and each column may represent different aspects of the path at each point in time. For example, the columns may represent the heading, pose, x-position, y-position, z-position of the aerial vehicle, allowable deviation from the x, y, z position, velocities ($V_x$, $V_y$, $V_z$), yaw, pitch, roll, angular velocity, altitude, and/or any other information that may be utilized to determine a path for an aerial vehicle between a source location and a destination location. The data stores 1374 may also store any type of information or data, including but not limited to data relating to environmental conditions, operational characteristics, etc.

The servers 1372 may be connected to or otherwise communicate with the data stores 1374 and the processors 1376. The servers 1372 and/or the computer processors 1376 may also connect to or otherwise communicate with the network 1380, as indicated by line 1378, through the sending and receiving of digital data. For example, the controller 1370 may include any facilities, stations or locations having the ability or capacity to receive and store information or data, such as path tables, in one or more data stores, e.g., paths received from aerial vehicles and/or other controllers. In some implementations, the controller 1370 may be provided in a physical location. In other such implementations, the controller 1370 may be provided in one or more alternate or virtual locations, e.g., in a "cloud"-based environment. In still other implementations, the controller 1370 may be provided onboard one or more aerial vehicles, including but not limited to the aerial vehicle 1310.

The controller 1370 may also include a path control system 1373 that is configured to perform one or more of the operations or processes discussed above. For example, the path control system 1373 may be configured to determine paths for aerial vehicles under the control or management of the controller 1370, compute, receive, send, and/or store hash values for those paths, etc. In some implementations, the path control system 1373 may further be configured to compare paths for various vehicles within a region managed by the controller 1370, determine if any potential vehicle collisions or other problems exist with the paths, compute new paths if needed, and/or instruct rerouting of aerial vehicles. For example, if the path control system 1373 processes paths and determines that one or more aerial vehicles within the region managed by the controller 1370 have intersecting paths that may result in a collision, the path control system 1373 may compute an alternate path for one or more of those vehicles, store the alternate path in the path table data store 1374-2 and provide that alternate path and/or a hash value representative thereof, to the one or more aerial vehicles.

The network 1380 may be any wired network, wireless network, or combination thereof, and may comprise the Internet in whole or in part. In addition, the network 1380 may be a personal area network, local area network, wide area network, cable network, satellite network, cellular telephone network, or combination thereof. The network 1380 may also be a publicly accessible network of linked networks, possibly operated by various distinct parties, such as the Internet. In some implementations, the network 1380 may be a private or semi-private network, such as a corporate or university intranet. The network 1380 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and, thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The aerial vehicle 1310 or the controller 1370 may use any web-enabled or Internet applications or features, or any other client-server applications or features including E-mail or other messaging techniques, to connect to the network 1380, or to communicate with one another, such as through short or multimedia messaging service (SMS or MMS) text messages. For example, the aerial vehicle 1310 may be adapted to transmit information or data in the form of synchronous or asynchronous messages to the controller 1370 or to any other computer device (e.g., other vehicles and/or other controllers) in real time or in near-real time, or in one or more offline processes, via the network 1380. The protocols and components for providing communication, such as notifications, between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the processor 1312 or the processor 1376, or any other computers or control systems utilized by the aerial vehicle 1310 or the controller 1370, and having sequences of instructions which, when executed by a processor (e.g., a central processing unit, or "CPU"), cause the processor to perform all or a portion of the functions, services and/or methods described herein. Such computer executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or include signals that may be downloaded through the Internet or other networks.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, although some of the implementations disclosed herein reference the use of unmanned aerial vehicles to deliver payloads from warehouses or other like facilities to customers, those of ordinary skill in the pertinent arts will recognize that the systems and methods disclosed herein are not so limited, and may be utilized in connection with any type or form of aerial vehicle (e.g., manned or unmanned) having fixed or rotating wings for any intended industrial, commercial, recreational or other use.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Disjunctive language, such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially," as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:
   receiving a notification to be sent to one or more agents within a service area, wherein the service area includes at least a first region and a second region that is different than the first region;
   determining that the notification is designated for the first region;
   determining if the first region is within a third region of the service area that is larger than the first region;
   determining if the first region includes a sub-region; and
   in response to determining that the first region is within the third region and the first region includes the sub-region, sending the notification to agents that subscribe to at least one of the first region, the third region, or the sub-region without sending the notification to agents that subscribe to the second region that do not also subscribe to at least one of the first region, the third region, or the sub-region; and
   wherein an agent may subscribe to any of the first region, the second region, the third region, or the sub-region independent of a location of the agent.

2. The computer-implemented method of claim 1, further comprising:
   in response to determining that the first region is within the third region and the first region does not include the sub-region, sending the notification to agents that subscribe to at least one of the first region or the third region, without sending the notification to agents subscribed to the second region that are not also subscribed to at least one of the first region or the third region.

3. The computer-implemented method of claim 1, further comprising:
in response to determining that the first region is not within the third region and the first region includes the sub-region, sending the notification to agents that subscribe to at least one of the first region or the sub-region, without sending the notification to agents that subscribe to the second region or the third region that do not also subscribe to the first region or the sub-region.

4. The computer-implemented method of claim 1, further comprising:
in response to determining that the first region is not within the third region and the first region does not include the sub-region, sending the notification to agents that subscribe to the first region, without sending the notification to agents that subscribe to third region that do not also subscribe to the first region.

5. The computer-implemented method of claim 1, wherein an agent may subscribe or unsubscribe from any region within the service area.

6. A computer-implemented method, comprising:
receiving a first notification designating a first region for the first notification;
determining that the first region is a sub-sub-region of a hierarchical reference system;
determining a first plurality of agents subscribed to receive notifications designated for the sub-sub-region;
determining a second plurality of agents subscribed to receive notifications designated for a sub-region that contains the sub-sub-region;
determining a third plurality of agents subscribed to receive notifications designated for a first region that contains the sub-region;
determining a fourth plurality of agents subscribed to receive notifications designated for a second region that is different than the first region; and
sending the notification to the first plurality of agents, the second plurality of agents, and the third plurality of agents, without sending the notification to agents of the fourth plurality of agents if the agent is not also included in the first plurality of agents, the second plurality of agents, or the third plurality of agents; and
wherein an agent may subscribe to any of the first region, the second region, the sub-region, or the sub-sub-region independent of a location of the agent.

7. The computer-implemented method of claim 6, further comprising:
determining a fifth plurality of agents subscribed to receive notifications designated for a second sub-region that is contained by the first region and is not contained in the sub-region or the sub-sub-region; and
not sending the notification to the fifth plurality of agents unless an agent of the fifth plurality of agents is also subscribed to receive notifications from at least one of the first region, the sub-region, or the sub-sub-region.

8. The computer-implemented method of claim 6, wherein an agent may subscribe or unsubscribe from any one or more of the first region, the sub-region, the sub-sub-region, or the second region.

9. The computer-implemented method of claim 8, wherein the agent is at least one of a controller or a vehicle.

10. The computer-implemented method of claim 6, further comprising:
receiving from a first agent, a request to subscribe to the first region; and
adding an identifier corresponding to the first agent to a list associated with the first region.

11. A method, comprising:
receiving a notification that designates a first sub-region, wherein the first sub-region is contained in a first region of a service area;
determining a first plurality of agents that subscribe to the first region;
determining a second plurality of agents that subscribe to the first sub-region;
determining a third plurality of agents subscribed to a second sub-region that is contained within the first region but not contained within the first sub-region; and
sending the notification to the first plurality of agents and the second plurality of agents, without sending the notification to agents of the third plurality of agents unless the agent is also an agent of the first plurality of agents or the second plurality of agents.

12. The method of claim 11, further comprising:
receiving, from a first agent, a subscription notification for the first region; and
subscribing the first agent to the first region.

13. The method of claim 11, wherein an agent of the first plurality of agents is at least one of an aerial vehicle, a ground based vehicle, a water based vehicle, an unmanned aerial vehicle, an unmanned ground based vehicle, or an unmanned water based vehicle.

14. The method of claim 11, further comprising:
receiving a second notification that designates the first region; and
sending the second notification to the first plurality of agents, the second plurality of agents, and the third plurality of agents, without sending the second notification to agents that are not included in at least one of the first plurality of agents, the second plurality of agents, or the third plurality of agents.

15. The method of claim 11, wherein the notification includes a hash value corresponding to a path of an aerial vehicle entering the first sub-region.

16. The method of claim 11, further comprising:
receiving, from an agent, a request to unsubscribe from the first region; and
unsubscribing the agent from the first region.

\* \* \* \* \*